March 24, 1970 — H. K. HERGLOTZ — 3,502,925

HIGH INTENSITY X-RAY SOURCE

Filed March 14, 1968

INVENTOR
Heribert K. Herglotz
BY Harry J. McCauley
ATTORNEY

March 24, 1970     H. K. HERGLOTZ     3,502,925
HIGH INTENSITY X-RAY SOURCE
Filed March 14, 1968     5 Sheets-Sheet 2
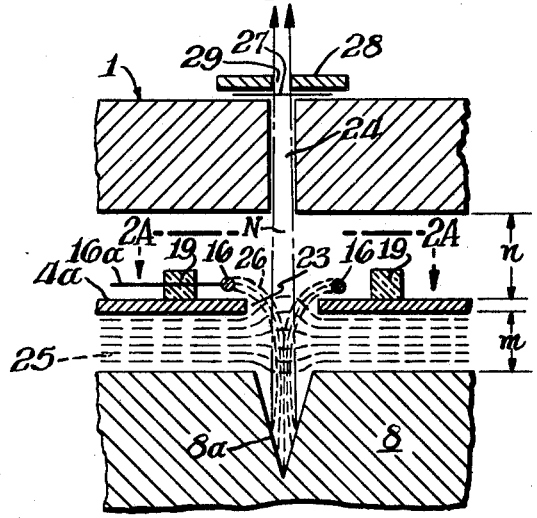
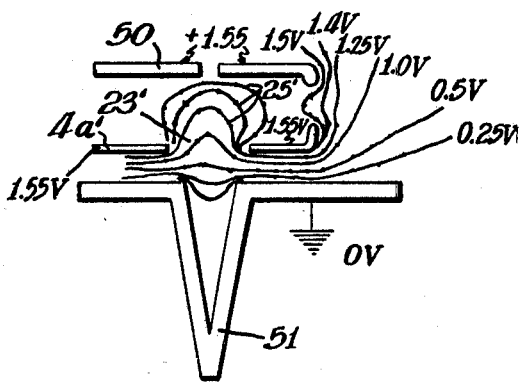
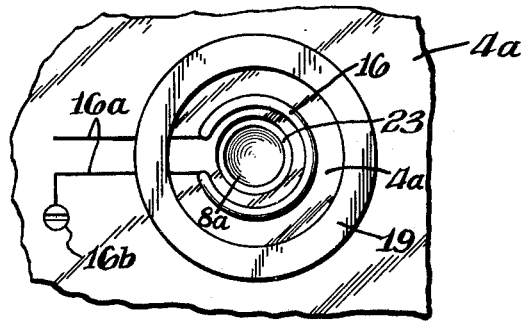
INVENTOR
Heribert K. Herglotz
BY Harry J. McCauley
ATTORNEY

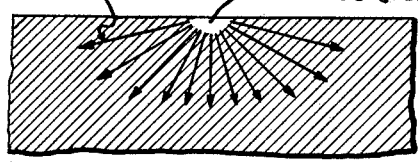
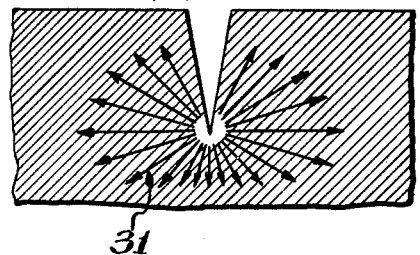
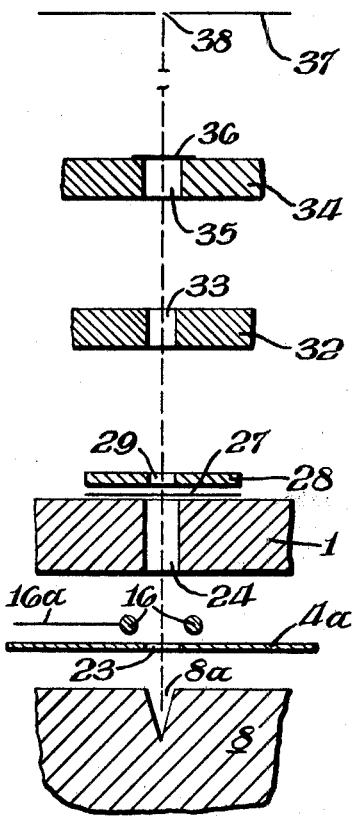
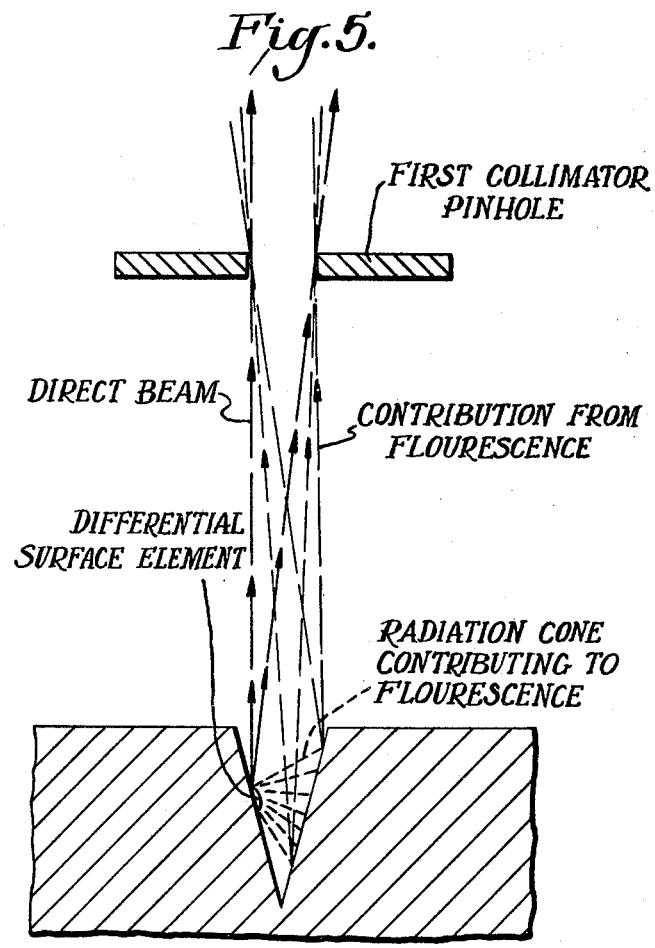

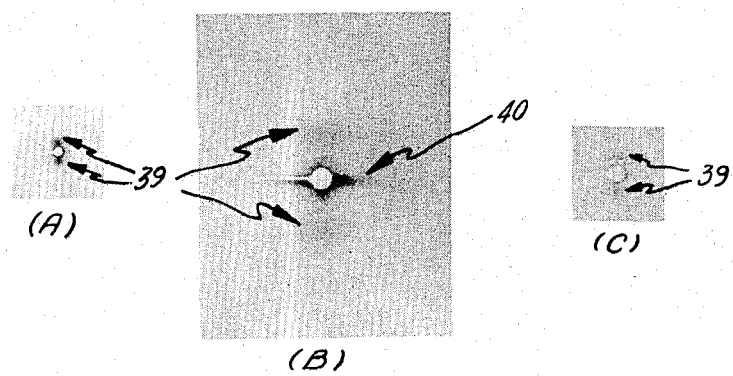
FIG. 7. DIFFRACTION BY 148 Å PERIODICITY
AND EQUATORIAL SCATTERING
(A) Cu-radiation 50 kv, 7.5 ma, 2 hr
17.5 cm sample-to-film distance (= D)
(B) Al-radiation 14 kv, 10 ma, 15 hr
D = 17.5 cm
(C) As (A), but D = 32 cm 3,502,925
HIGH INTENSITY X-RAY SOURCE
Heribert K. Herglotz, Maplecrest, Del., assignor to E. I. du Pont de Nemours and Company, Wilmington, Del., a corporation of Delaware
Filed Mar. 14, 1968, Ser. No. 713,223
Int. Cl. H01j 35/14
U.S. Cl. 313—55    4 Claims

ABSTRACT OF THE DISCLOSURE

A high intensity X-ray source incorporating a conical target site, multiple aperture radiation collimation and electron focusing.

CROSS REFERENCE TO RELATED APPLICATIONS

The utilization of this invention in the chracterization of specially treated polyamide membranes employed for reverse osmosis separations in the purification of saline and brackish waters is taught in U.S. application Ser. No. 674,425.

BRIEF SUMMARY OF THE INVENTION

Generally, this invention comprises a high intensity source of well-collimated X-rays (particularly "soft," i.e., relatively long wavelength X-rays) comprising, within an evacuated housing, an anode element consisting of a cooled metal mass provided with a right conical depression as target anode and a coil-form metal cathode of diameter greater than the opening into the conical depression disposed substantially concentric with, and on the open side of, the conical depression, electron focusing means comprising a metallic plate maintained at substantially the same electrical potential as the cathode having an aperture substantially concentric with the cathode and the conical depression of diameter intermediate the diameter of each disposed closely adjacent the cathode in order to constitute a direct-line shielding barrier between the cathode and the conical depression, and a radiation-absorbing base plate on the opposite side of the cathode from the anode provided with a cylindrical radiation collimating bore substantially concentric with the cathode, the conical depression and the aperture in the electron focusing means.

DRAWINGS

Figure 1:
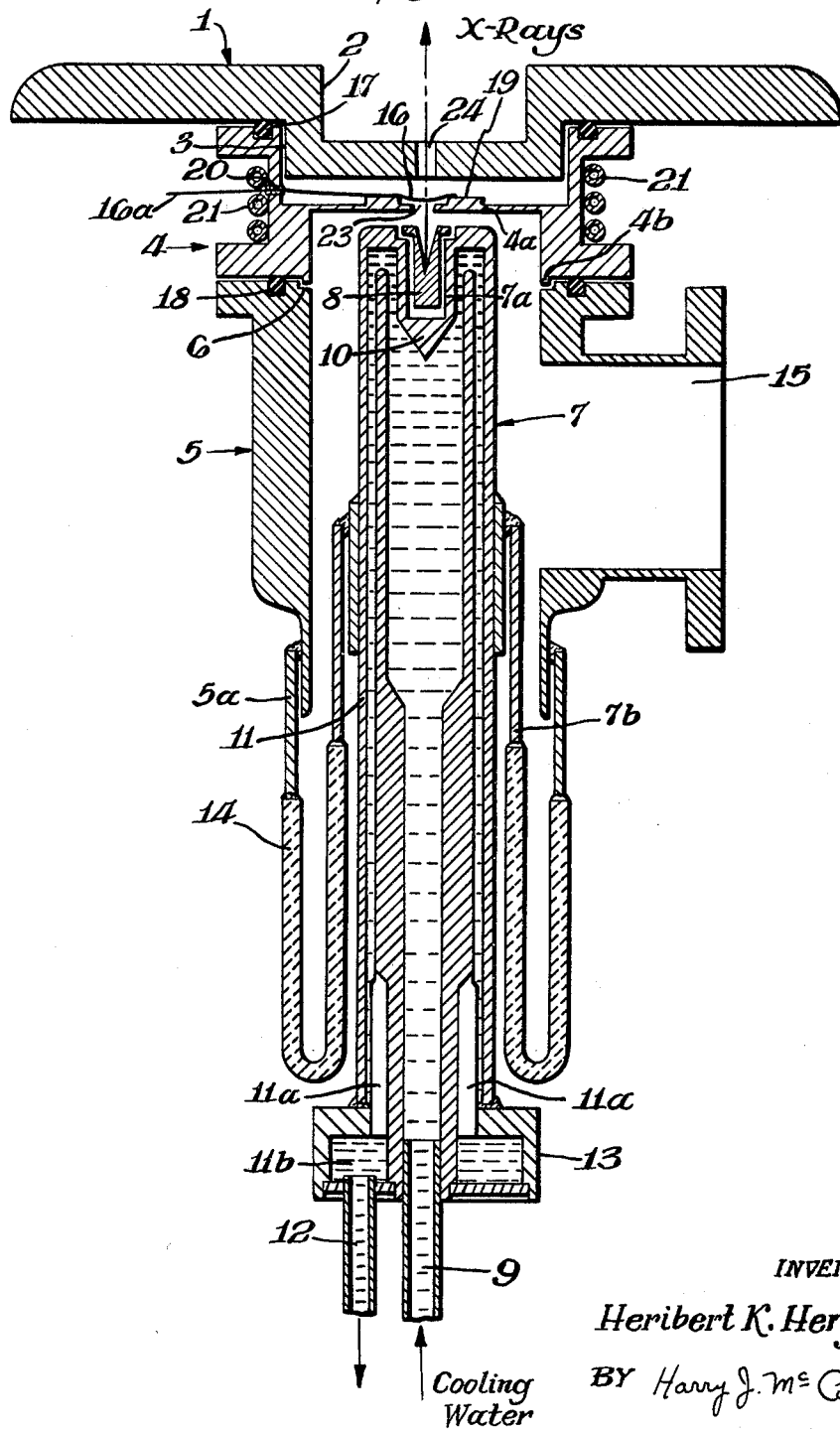
Figure 8:
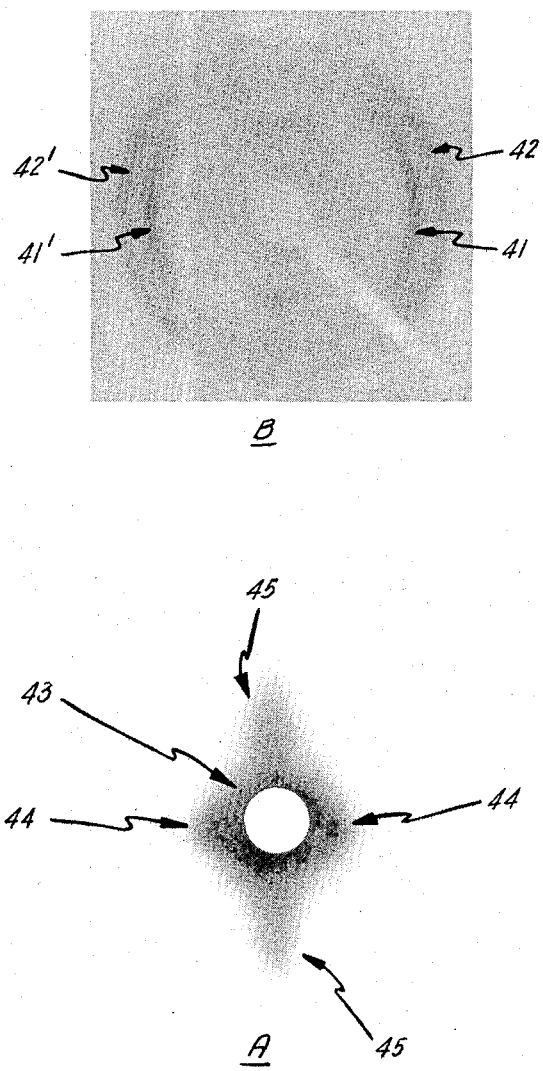

The following drawings detail the construction and operation of an X-ray source according to this invention, as to which:

FIG. 1 is a partially schematic side elevation cross-sectional view of a preferred embodiment of stable, high-intensity soft X-ray source of this invention, FIG. 2 is a detailed schematic side elevation cross-sectional view of the anode-cathode-adjacent collimator sub-combination of the apparatus of FIG. 1, FIG. 2A is a plan view taken on lines 2A—2A, FIG. 2, FIG. 3 is an electric field distribution plot for the sub-combination of FIG. 2, FIGS. 4(A) and 4(B) are diagrammatic cross-sectional representations of heat dissipation capabilities for a flat target anode and a conical target anode, respectively, FIG. 5 is a diagrammatic representation of radiation intensity enhancement obtainable with the apparatus of FIGS. 1 and 2, FIG. 6 is a schematic side elevation cross-sectional representation of a small-angle X-ray diffraction system incorporating the soft X-ray source of FIGS. 1, 2 and 2A, FIGS. 7(A) and (C) show typical photographic diffraction patterns obtained with a commercial copper target apparatus as compared with apparatus according to this invention having an aluminum target, FIG. 7(B) and FIGS. 8(A) and (B) show typical photographic diffraction patterns obtained in the examination of a permeable polymeric material using soft (long wavelength) X-rays and shorter wavelength X-rays, respectively.

DETAILED DESCRIPTION

X-ray scattering and diffraction techniques are important to the study of the submicroscopic structure of materials. There has long existed particular need for a stable, high-intensity source of soft (long wavelength) X-rays to extend use of these techniques to the study of structures of long chain polymers, or for particle size analysis. Thus, X-ray diffraction provides valuable information as to the structure of materials in accordance with the Bragg's Law principle, the quantitative expression of which, in terms of spacing ($d$) of atomic planes in a crystal lattice, is as follows:

$n\lambda = 2d \sin \theta$ where
$n$ = order of diffraction
$\lambda$ = wavelength of X-radiation
$d$ = interplanar spacing, and
$\theta$ = Bragg angle of diffraction.

It is apparent from this that, since $\theta$ is both the angle of incidence and the angle of diffraction, the total deviation of X-rays striking a material is an angle $2\theta$.

In a typical method for X-ray diffraction inspection, a specimen is irradiated by a collimated (small divergence) beam of X-rays of known wavelength. The diffracted rays are detected and recorded on photographic film, for example, located a known distance from the specimen. Measurement of the distance from the image of the undiffracted beam to the several diffraction maxima permits the determination of the respective $\theta$ by simple geometry. Each $\theta$ represents diffraction of order $n$ ($n=1, 2, 3, \ldots$) on a set of crystal planes having a spacing $d$.

The most convenient known method of generating X-rays of a preselected wavelength is by bombardment of a specific target material with a stream of high-velocity electrons. High-intensity X-rays are produced at known characteristic wavelengths by electron bombardment of each element employed as a target material. In general, the lower the atomic number of the target substance the longer the characteristic wavelength. The wide frequency spectrum of lesser intensity accompanying the characteristic X-ray wavelength can be filtered out by known techniques, so that essentially monochromatic radiation of characteristic wavelength is obtained. The following is a tabulation of X-ray wavelengths and excitations applicable to several target materials:

| Material | X-ray wavelength in Angstrom units | Excitation shell |
|---|---|---|
| Cu | 1.54 | K |
| Cr | 2.3 | K |
| Al | 8.34 | K |
| Cu | 13.3 | L |
| Fe | 17.6 | L |
| Cr | 21.7 | L |
| O | 23.7 | K |
| Ti | 27.4 | L |
| C | 44 | K |

In general, the K-shell excited wavelengths are of higher intensity and easier to generate.

The choice of target material in a given instance is complicated by man factors, some of which result from the inefficiency of electron bombardment as a method of X-ray generation. Thus, even with an accelerating potential of 100 kv. in a typical X-ray tube, it is normal for less than ½% of the energy of the bombarding electrons to produce X-rays. Under these circumstances, very large amounts of heat are liberated, which must be speedily dissipated to prevent target damage. This makes not only good electrical conductivity but superior thermal conductivity and high melting temperatures equally important (and interrelated) criteria in target selection.

Copper has been extensively utilized as a target material because of both its high thermal conductivity and its relatively high melting temperature, which permit generation of a high-intensity X-ray beam without either target damage or contamination. For many X-ray diffraction studies, Cu has a convenient characteristic $\lambda$ of 1.54A (A=10$^{-8}$ cm.).

However, longer wavelengths are frequently needed, especially when studying materials with relatively large spacings or periodicities $d$, common in long-chain polymers, or when studying fine-sized particles, where commingled sub-microscopic particles cause scattering similar to lattice diffraction, but without a high degree of directionality. This can be appreciated when it is seen that with Cu radiation of 1.54A and a $d$ value of 25A, the corresponding $2\theta$ is $3°32'$; for a $d$ value of 50A, $2\theta$ is $1°46'$; and for a $d$ value of 400A, $2\theta$ is $13°25'$. Such small angles as these place the diffraction pattern so close to the primary beam image that is extremely difficult, if not indeed impossible to detect and resolve the patterns.

It appears that, in a solid polymer, the periodic variations of electron density, $\sigma$, resulting from the different numbers of eletcrons associated with atoms of different atomic number in the structure gives rise to observable diffraction maxima. The degree of sensitivity with which these electron densities can be observed increases with increase in wavelength of the X-radiation used. It is a fact that the regular periodic arrangement of carbon, hydrogen and nitrogen atoms in the crystalline sections of a polymer do not contribute to diffraction of long wavelength radiation at any glancing angle $\theta$, since the periodicities are such that the Bragg's Law quotient $n\lambda/2d$ (which equals sin $\theta$) is greater than 1. However, when sections of the polymer possess differences in crystallinity and, thus, differences in density with corresponding differences in electron density, the latter differences cause a scattering effect. Longer wavelength radiation makes these electron density differences more readily discernible and, if these electron density differences within the polymer are periodic, a characteristic X-ray diffraction "pattern" results.

Many attempts have been made to overcome the deficiencies of existing equipment in order to conduct studies on the new polymeric materials. Some researchers have attempted to increase the dispersion spacing recorded on the photographic film by significantly increasing the sample-to-film spacing, so as to separate the patterns of interest farther from the primary beam image. This approach requires long collimation systems, which result in an inverse square power reduction in intensity of radiation reaching the specimen, necessitating extremely long exposures of the order of 100 hours or more. Attempts to increase intensity by slit, as opposed to pinhole, collimation give patterns difficult to interpret, due to poor collimation in the direction of slit length.

Resort to longer analytical wavelengths, such as the characteristic $\lambda$ of 8.34A for aluminum as target material, gives a more than fivefold increase in dispersion angle, but the longer the X-ray radiation wavelength the greater the absorption by most sample materials. Use of 8.34A radiation has required working entirely in a vacuum in order to reduce absorption and scattering and, even at the Cu $\lambda$ of 1.54A, at least a part of the X-ray path should be evacuated to reduce losses from these causes.

In addition, while aluminum has good heat transfer properties, its relatively low melting point of 659.7° C. necessitates special attention to the prevention of local melting and resulting damage to the target surface during electron bombardment. Also, since soft X-rays are so readily absorbed by most materials, surface contamination from any source, including evaporation coating emanating from the hot cathode, constitutes a serious operating problem. Sample thickness must be kept to a minimum to reduce absorption, and the choice of filters to provide monochromatic radiation is a critical matter.

All of the foregoing difficulties have limited progress in small-angle X-ray analysis technology, which has been further hampered by ambiguities in the results obtained from the inadequate apparatus and techniques currently available.

My invention constitutes an improved X-ray source, regardless of the wavelength desired, but is especially advantageous for soft, or long, wavelength generation, because of the current pressing need in this area. Apparatus constructed as hereinafter described has made possible not only the attainment of the usual pattern information with considerable enhancement in clarity, but also the higher dispersion and greater sensitivity of the soft X-rays generated has produced diffraction patterns embodying information not previously detected.

The high efficiency, high stability and fine collimation obtainable with my apparatus is the result of a combination of factors involved in the X-ray tube structure design. These include the use of an aluminum target which, instead of being a flat surface, is formed as a right conical depression or cavity constituting a three-dimensional "line focus," thereby affording not only increased heat dissipation but also reinforced radiation of the characteristic wavelength of the target material as a result of excitation from primary X-radiation impacting the conical walls. There is also provided an improved cathode filament shield which initially collimates the radiation to produce an intense bundle of collimated soft X-rays. Additional pinhole shields, interrelated in aperture size and spaced in train about the exit path of the X-ray beam output, confer further collimation and bar secondary radiation from the system without objectionably reducing the intensity of the usable primary beam. Finally, if desired, insertion of a thin aluminum foil in the beam path will effect a filtering action absorbing most extraneous accompanying wavelengths, while passing 64% or more of the characteristic 8.34A radiation.

Referring to FIG. 1, a preferred embodiment of demountable soft X-ray source according to this invention is shown schematically in longitudinal cross-section having a cylindrical base plate 1 provided with a recess 2 for aligned attachment of a recording photographic camera, not shown. Recess 2 is drilled centrally at 24 to give a straight bore axial aperture for the soft X-rays generated. The underside of base plate 1 is machined to an accurate depending shoulder 3 adapted to receive in precise alignment therewith cylindrical cathode section 4, which is of double-flanged construction, provided with a transverse web section 4a axially drilled at 23 in alignment with aperture 24 to define a primary aperture for the apparatus.

The tube body 5 attaches to the lower end of cathode section 4 and is machined with an annular groove 6 accepting a depending lip 4b, mutually aligning the two components. The top faces of both cathode section 4 and tube body 5 are provided with circular grooves 17 and 18, respectively, within which are mounted conventional elastomeric O-rings serving as vacuum seals.

Tube body 5 houses the water-cooled anode support structure denoted generally at 7, which is axially mounted therein with its uppermost end recessed at 7a to accept the aluminum metal cavity target denoted generally at 8. Support structure 7 is of telescopic tubular construction, thereby functioning as a reverse flow baffle receiving cooling water introduced via electrically insulated inlet coupler 9 at the bottom, circulating it peripherally past the cone-profiled target support re-entrant element 10 and discharging it by downward flow through annular jacket 11, thence through voiding flutes 11a into annular receiver 11b, and finally out electrically insulated warm water exit tube 12. The lower end of anode structure 7 serves as the apparatus high voltage terminal at 13, the entire sub-assembly being electrically insulated from the external components 1, 4 and 5, which are grounded for safety, by support from re-entrant glass insulator 14, attached by fusing to depending skirts 5a and 7b on the exterior and interior, respectively.

Tube body 5 is provided with a flanged side inlet vacuum connection 15, permitting evacuation of the apparatus to a high vacuum level ($10^{-5}$ to $10^{-7}$ mm. Hg) for best operation. As seen in fullest detail in FIGS. 2 and 2(A) a heated filament one-turn circular coil cathode 16, is mounted circumferentially of aperture 23 on the upraised support indicated generally at 19, electrical connection therewith being made via leads 16a, one of which is passed through insulation sleeve 20 and the other of which is connected in electrical circuit with web 4a by terminal screw 16b tapped into the web. Support 19 can conveniently comprise an electrically insulating ceramic ring drilled radially to receive leads 16a. Typically, cathode 16, the high-energy electron bombardment source, is a 0.010" dia. 3% thoriated tungsten wire heated by a filament potential of approximately 3 volts. Cathode section 4 is cooled by cold water circulation tubing 21 wrapped externally thereof.

The demountable tube construction described is particularly preferred, because element replacement, such as a burned-out filament cathode, for example, is readily effected and the anode targets can be replaced at will, not only to rectify contamination or damage suffered during service but also whenever a different X-ray wavelength is desired. This greatly extends the range of tube application.

The apparatus is quite compact, typically being only 7–8" long, with the greater part of the length being necessary to accommodate vacuum and high voltage connection at appropriate safe spacings. A permanently sealed construction is much shorter but, of course, not so flexible in service.

The precise relative location of anode and cathode elements, and their construction, is shown (partially schematically) in FIG. 2 from which background details has been omitted for purposes of simplification. Here the anode target is seen to be a polished sidewall right conical depression 8a which, typically, has a base diameter of 0.035" and an axial depth of 0.060", which is relatively easy to drill or punch. In these proportions, the included angle of the cone is about 30°, the angle between the axis and a cone generating ray then being 15°. Relatively steep-sloped conical cavities 8a wherein the altitudes are approximately twice the base opening diameters are particularly desirable, because X-radiation differs from visible radiation in its non-conformity with the Lambert cosine law. Thus, intensity of X-radiation is nearly independent of angle for angles of impingement greater than about 10° from the target face. Below this angle, intensity decreases progressively more rapidly with diminishing angle. As shown in FIG. 5, a very large portion of the X-radiation will be radiated out of a 30° conical cavity with a divergence of only about 5° or less from the axis.

Web 4a is typically 0.010–0.020" thick and is separated from the opening of cavity 8a by a distance $m=0.093"$. Thus, when aluminum target 8 is maintained at a positive potential of 15 to 20 kv., electrons, which accumulate as a cloud in the vicinity of cathode 16, are drawn therefrom under an accelerating field strength of 50–100 kv./cm. The nature of the field is indicated by the equipotential plot lines 25 drawn in in FIG. 2 which bow into aperture 23 and thereby act on the electrons as a collecting-dispersing lens, directing the electrons into conical cavity 8a. (In fact, the bowing of the field lines and their reach into cathode section 4 is undoubtedly more pronounced than represented in the schematic showing of FIG. 2. A mock-up, two-dimensional model of the electrode sub-assembly of this invention was fabricated with electrically conductive tape on a base of electrically resistive paper, as shown in FIG. 3, and the equipotential distribution actually measured and plotted for the situation where the upper aperture electrode 50 was maintained at +1.55 v. whereas the conical counterelectrode 51 was grounded. It will be seen that the equipotential lines 25', the respective voltages of which are indicated at their right terminal ends, bow very strongly and extend well past the aperture 23' in the transverse web section 4a'.)

The electron lens effect is a very important feature of my tube design, because of the necessity for precise control of electron travel between the closely spaced electrodes of the apparatus. Moreover, as seen in FIG. 2 particularly, the surface of cathode 16 lies radially outward a typical distance of 0.002" from the periphery of aperture 23, so that web section 4a serves as an evaporation shield screening the cathode from straight line exposure with respect to cavity 8a. This is essential to safeguard against evaporative contamination of the target anode by the hot cathode, metal particles being uncharged and having a relatively large mass as compared with electrons, so that the former travel straight line courses whereas the latter follow the trajectories 26 and thus easily traverse aperture 23.

Cavity-form targets are highly advantageous from the standpoint of heat dissipation, as represented in FIGS. 4(A) and 4(B), the former showing a flat target type electrode and the latter a conical target. Surrounded by conductive metal as the latter is over 330 degrees of its cross-sectional expanse around the electron focus spot, the heat dissipation courses indicated by lines 31 are much more numerous than the courses 30 of FIGS. 4(A).

Conical cavity targets possess yet another advantage in that they increase the intensity of X-rays over the intensity obtained with a flat target such as represented in FIG. 4(A). This increase in intensity is the result of several independent processes, namely:

(1) Scattered electrons, retaining sufficient energy, are afforded additional opportunities of producing the desired characteristic X-rays by ionization of the K shell of target atoms by striking the walls after scattering. These electrons would be expected to retain sufficient energy, since the source is usually operated at a voltage approximately ten times the minimum excitation voltage of Al radiation (1.56 kv.).

(2) Electrons which have produced X-radiation by causing a K-deficiency (1.56 kv.) may retain sufficient energy to cause additional K ionization as described hereinabove in (1).

(3) Bremsstrahlung (X-radiation at other wavelengths) striking the walls of the conical cavity can excite fluorescent K-radiation.

FIG. 5 illustrates schematically how increments of energy, which are normally wasted in a flat target tube, contribute to useful X-radiation output from a cavity target. The diagram is limited to only a single local site for clarity in the showing, it being understood that the total output of useful energy is the integrated sum of all that generated by similar excitation along the entire line element of the cone and around the entire circular base, which can be substantial.

The geometry of a cavity target is usually a compromise between ease of construction and optimum X-ray output. In general, a shallow wide-angle depression is easier to produce by normal metal-working techniques than a small-angle cavity. However, a small-angle cavity has a greater ratio of actual surface area to normal projected area and thus, for a given impinging electron beam cross-sectional area, the target area which is subjected to bombardment increases as the cone angle decreases. Such a relationship simultaneously improves the heat dissipation capabilities of the target and therefore reduces the possibility of target damage due to concentrated bombardment. Moreover, resort to a small conical angle for the target cavity improves radiation generation efficiency by prefocusing the X-rays into a beam of high intensity in the axial region with rapid fall-off in intensity with angular divergence from the axis.

Long wavelength X-rays produced by the electron bombardment of target 8a are delivered as a stable, well-collimated beam N which traverses primary aperture 23 in an upwardly direction and then passes through axially aligned aperture 24 (typically 0.030" dia.) drilled through base plate 1 (typically 0.125" thick), the bottom surface of which is spaced a typical distance $n=0.25"$ from web section 4a. The relatively long aperture 24, coupled with its smaller diameter as compared with aperture 23 (0.040"), additionally collimates the X-ray beam.

The outside surface of base plate 1 can support a thin filter window 27, e.g., 0.0002" thick aluminum foil for Al characteristic radiation, which can be held in place by first primary collimator plate 28, typically 0.020" thick, provided with a pinhole aperture 29 preferably slightly smaller in diameter than aperture 24 (e.g., 0.025"). Filter window 27 is not absolutely essential in all instances and can some times be advantageously dispensed with where high radiation intensities are desirable in order to reduce sample exposure times. However, when used, the filter passes the characteristic wavelength radiation while effectively filtering out other accompanying wavelengths, thereby providing an essentially monochromatic X-ray beam. Also, the filter blocks visible radiation from the glowing filament 16, which can cause an undesirable fog level when a film detector is employed.

Since, for soft X-rays especially, it is desirable that the detector or camera section of the X-ray diffraction apparatus also be evacuated to a relatively low absolute pressure level in order to reduce radiation losses as a result of absorption and scattering by air, the pressure differential across filter window 27 will not usually be sufficient to cause deformation or rupture.

Referring to FIG. 6, the soft X-ray source of this invention is shown schematically in association with a collimation system and camera such as customarily employed for small-angle diffraction studies. The dual elements of the X-ray source sub-assembly are denoted by the same reference numerals as hereinbefore utilized, whereupon a prefocused intensified X-ray beam emerges from aluminum filter window 27.

The remainder of the equipment comprises the fine collimation-diffraction camera attachment. The precise collimation necessary to produce clear diffraction or scattering pictures is provided by three small aligned circular pinhole apertures the first of which is 29, already described. The second pinhole aperture 33, typically 0.020" dia. cut through plate 32, typically 0.062" thick, is positioned so that confronting surfaces of plates 28 and 32 are spaced 0.896" apart.

Since X-rays in the beam which strikes the edges of apertures 29 and 33 can be diffracted, it is desirable to provide a third plate 34 provided with an in-line pinhole aperture 35 to capture these diffracted rays and guard the detector (X-ray film) from exposure to them, so that the X-rays diffracted or scattered by the sample will not have spurious rays superimposed which render pattern interpretation difficult. Guard pinhole aperture 35 is preferably made slightly larger in diameter (e.g., typically 0.030") than the preceding apertures 29 and 33, so that the collimated beam of X-rays is not obstructed thereby, while diffracted rays from upstream apertures are intercepted and absorbed by plate 34 (typically 0.062" thick and spaced at a confronting surface distance from plate 32 of 1.988").

The far side of plate 34 furnishes a convenient support for the sample 36 to be studied. Detector film 37 is located typically 6.96" from the nearest face of plate 34 supporting sample 36. Hole 38 in detector film 37 is cut to proper size to permit the undiffracted collimated primary beam of X-rays to pass through and be caught in a beam trap, or a conventional beam stop known to the art can be located in front of the film with diameter appropriately chosen to intercept and absorb the undiffracted collimated primary beam. Use of hole 38 is preferred over a beam stop, because there is then no unexposed film area cause by the beam stop support wire and, also, any problem arising from diffraction from the edges of a slightly misaligned beam stop is also eliminated.

As hereinbefore mentioned, the X-ray source up to filter window 27 is maintained at a high vacuum level of about $10^{-5}$–$10^{-7}$ mm. Hg. To avoid radiation scattering by air molecules, the collimator-camera section beyond filter window 27 is preferably also evacuated to a level of $10^{-3}$–$10^{-6}$ mm. Hg.

The demountable design of apparatus hereinbefore detailed has marked advantages of convenience in target changing, repair or replacement, and also filament replacement. Making the collimator-camera sub-assembly as additional mounting segments facilitates sample insertion, film changing and pinhole system alignment. Alignment problems as regards the several apertures, beam stop (if used) and the like are simplified by the use of tubular metal support elements of preselected length, suitably machined to receive and locate accurately the various components involved. Initial alignment can be achieved by visual examination in coarse and medium positioning using a light source directed down the collimator-camera. Fine adjustment is then made using the X-ray source without a sample in place, to ensure that the guard 34 is positioned to intercept any stray diffracted rays and that pinhole apertures 29 and 33 are appropriately positioned to give the desired primary beam size and shape.

The high stability and intensity of a soft X-ray source according to this invention is demonstrated by the diffraction diagrams of FIG. 7. The diffraction patterns shown are for the examination of a polypropylene yarn with a measured periodicity of 148A. FIG. 7(A) is the pattern obtained with a conventional commercial Cu target apparatus ($\lambda=1.54A$) with the sample-to-film distance 17.5 cm. (6.96"). This was a 2 hour exposure with the tube energized to 50 kv. and drawing a current of 7.5 ma. ($2.7 \times 10^6$ joules).

The pattern shown in FIG. 7(B) was obtained using apparatus according to this invention embodying an Al target ($\lambda=8.34A$) with the same sample-to-film distance (17.5 cm.) as that of FIG. 7(A). This pattern required a 15 hour exposure with the tube energized at only 14 kv. and drawing a current of 10 ma. ($7.56 \times 10^6$ joules). The wider relative spacing achieved with the Al radiation for "dots" 39 is readily apparent. In addition to this periodicity information of the "dots," the Al radiation diagram of FIG. 7(B) contains equatorial scattering 40, which indicates the presence of voids. FIG. 7(A) is essentially devoid of any such scattering for the Cu radiation. Even when the sample-to-film distance is nearly doubled and a Cu diagram made at 32 cm. sample-to-film distance to produce linear enlargement of the diagram, as seen in FIG. 7(C), the equatorial scattering information, although discernible, is still far from satisfactory.

Study of the FIG. 7(B) diagram was analyzed as indicative of the presence of voids in the polymeric yarn. This was subsequently confirmed by density measurements.

In another study conducted on selectively degraded permeable polyamide membranes as detailed in full in said application Ser. No. 674,425, soft X-ray patterns had the form shown in FIG. 8(A), whereas those for shorter wavelength X-rays (Cu=1.54A) are shown in FIG. 8(B). The diffraction arcs 41, 42, 41' and 42' of FIG. 8(B) furnish a measure of the presence of degree of crystallinity.

The soft X-ray pattern of FIG. 8(A) reveals a halo 43 with equatorial 44 and meridional 45 scattering. Analysis of this pattern provided information relative to product liquid permeability characteristics. Such patterns are believed to be caused by scattering centers having a shape, arrangement or size requiring long wavelength small-angle diffraction equipment in order for detection, and apparatus of this invention is the only design known having the requisite high radiation stability and intensity.

As hereinbefore stated, a wide range of characteristic radiations can be generated using my novel source, in which case the proper filter material in any given instance must be matched with the particular wavelength generated. Since absorption of longer wavelengths is a severe problem, it may sometimes be advantageous to resort to yet other techniques of ensuring monochromaticity, including the use of total reflection techniques as taught in U.S. application Ser. No. 566,057 of common inventorship.

From the foregoing, it will be understood that this invention is subject to relatively wide modification within the skill of the art without departure from its essential spirit, and it is accordingly intended to be limited only by the scope of the following claims.

What is claimed is:

1. A high-intensity source of well-collimated X-rays comprising, in combination, within an evacuated housing
   an anode element consisting of a cooled metal mass provided with a right conical depression as target anode and a coil-form metal cathode of diameter greater than the opening into said conical depression disposed substantially concentric with and on the open side of said conical depression,
   electron focusing means comprising a metallic plate maintained at substantially the same electrical potential as said cathode and having an aperture substantially concentric with said cathode and said conical depression of diameter intermediate the diameter of each disposed closely adjacent said cathode to constitute a direct-line shielding barrier between said cathode and said conical depression, and
   a radiation-absorbing base plate on the opposite side of said cathode from said anode provided with a cylindrical radiation collimating bore substantially concentric with said cathode, said conical depression and said aperture in said electron focusing means.

2. A high-intensity source of well-collimated long wavelength X-rays according to claim 1 wherein said anode element is aluminum.

3. A high-intensity source of long wavelength X-rays according to claim 1 wherein said conical depression is of approximately 30° total angular magnitude.

4. A high-intensity source of well-collimated long wavelength X-rays according to claim 1, provided with a radiation-transparent window of preselected radiation transmission characteristics in axial line with said radiation collimating bore.

References Cited

UNITED STATES PATENTS

| 2,046,808 | 7/1936 | Bouwers et al. | 313—57 |
| 3,124,710 | 3/1964 | Gray | 313—57 |
| 3,383,510 | 5/1968 | Sellers | 250—86 |

ROBERT SEGAL, Primary Examiner

E. R. LA ROCHE, Assistant Examiner

U.S. Cl. X.R.

313—59